US007059131B2

(12) United States Patent
Hildebrand (10) Patent No.: US 7,059,131 B2
(45) Date of Patent: Jun. 13, 2006

(54) METHOD AND SYSTEM FOR EXCHANGING EARTH ENERGY BETWEEN EARTHLY BODIES AND AN ENERGY EXCHANGER, ESPECIALLY TO PRODUCE AN ELECTRIC CURRENT

(75) Inventor: Hans Hildebrand, Walchwil (CH)

(73) Assignee: Hita AG (CH)

( * ) Notice: Subject to any disclaimer, the term of this patent is extended or adjusted under 35 U.S.C. 154(b) by 544 days.

(21) Appl. No.: 10/399,582

(22) PCT Filed: Oct. 17, 2001

(86) PCT No.: PCT/CH01/00621

§ 371 (c)(1),
(2), (4) Date: Apr. 18, 2003

(87) PCT Pub. No.: WO02/33332

PCT Pub. Date: Apr. 25, 2002

(65) Prior Publication Data

US 2004/0035110 A1 Feb. 26, 2004

(30) Foreign Application Priority Data

Oct. 20, 2000 (CH) .................................... 2058/00

(51) Int. Cl.
*F03G 7/00* (2006.01)
(52) U.S. Cl. ..................... 60/641.2; 60/641.3
(58) Field of Classification Search ............ 60/641.2, 60/641.3, 641.4, 641.5
See application file for complete search history.

(56) References Cited

U.S. PATENT DOCUMENTS 3,274,769 A 9/1966 Reynolds
3,782,468 A * 1/1974 Kuwada .................. 166/267
3,805,885 A * 4/1974 Van Huisen ............... 165/45
4,059,959 A * 11/1977 Matthews ................. 60/641.4

(Continued)

FOREIGN PATENT DOCUMENTS

DE 26 31 552 A1 1/1978

(Continued)

OTHER PUBLICATIONS

Brockhaus Encyclopedia, vol. 8, 19th edition, F.A. Brockhaus GmbH, Mannheim, 1989, pp. 337-338.

*Primary Examiner*—Hoang Nguyen
(74) *Attorney, Agent, or Firm*—George Pappas (57) ABSTRACT

An energy exchanger (2) is connected to an earth energy exchanger (18) via a flow line (10) and a return flow line (14). The flow line (10) and the return flow line (14) are both provided with a regulatable stop valve (12, 16). At least one heat-insulated flow pipe (20) is surrounded by a separation pipe (24) in a bore hole (22), whereby a return flow area (28) for circulatory water is connected thereto in a radially outward manner. The return flow area (28) contains at least one return flow pipe (30) connected to the return flow line (14) and a porous filling (38) in addition to being connected, at least on the base of the bore hole (22), to the lower inlet (46) of the flow pipe (20) or the lower inlets (46, 46a) of the flow pipes (20,20a) via one or several through openings (44) in the separation pipe (24). A connectable pressure medium device (56), and preferably a discharge valve (56) for discharging the circulatory water from the flow pipe (20) and triggering the production and transport of steam from the earthly body, is disposed on the flow line (10) between the stop valve (12) and the energy exchanger (18).

35 Claims, 6 Drawing Sheets

U.S. PATENT DOCUMENTS

| | | | |
|---|---|---|---|
| 4,201,060 A | * | 5/1980 | Outmans ................... 60/641.2 |
| 4,220,202 A | | 9/1980 | Aladiev et al. |
| 4,370,858 A | * | 2/1983 | Awerbuch et al. ......... 60/641.5 |
| 4,429,535 A | * | 2/1984 | Featherstone .............. 60/641.5 |
| 4,644,750 A | | 2/1987 | Lockett et al. |
| 5,937,934 A | | 8/1999 | Hildebrand |

FOREIGN PATENT DOCUMENTS

| | | |
|---|---|---|
| DE | 36 27 680 A1 | 2/1988 |
| WO | WO 01/04550 A1 | 1/2001 |

* cited by examiner

METHOD AND SYSTEM FOR EXCHANGING EARTH ENERGY BETWEEN EARTHLY BODIES AND AN ENERGY EXCHANGER, ESPECIALLY TO PRODUCE AN ELECTRIC CURRENT

TECHNICAL FIELD

The invention relates to a method according to the preamble of claim 1 and to a system for carrying out the method according to the preamble of claim 14.

PRIOR ART

Since the temperature in the earth's crust rises with an increasing depth, it is possible, with sufficiently deep bores with a depth from, for example, 2000 m to generate hot steam, by means of which, for example, a geothermal power station or a distant-heating system can be operated. A method of this type is of considerable economic interest. In what is known as the hot dry rock method (see, for example, Brockhaus Encyclopedia, vol. 8, 19th edition, F. A. Brockhaus GmbH, Mannheim, 1989, p. 337–338), the deep-seated heat from hot dry rocks is utilized in that two bores of sufficient depth are sunk at a distance from one another, and water is forced down through one bore into artificially widened crevices and is pumped to the surface again through the other bore as superheated water or as steam. Geothermal power stations according to the dry steam principle are the simplest to operate, in which the superheated steam can be delivered directly to the turbine blades for the drive of generators. Substantial disadvantages of the hot dry rock method are the necessity for two separate bore holes, the artificial widening of crevices in the deep-seated rock and the requirement of a sufficiently hot rock zone. Systems for extraction of earth energy from smaller depths than in the method initially mentioned are likewise known in many forms. Such systems utilize the earth energy at depths of 100 to 2000 m and above, in that, for example, circulatory water flows out of the return-flow line of an energy exchanger through a porous filling as far as the bottom of a bore hole, is at the same time heated and is led to the energy exchanger again by means of a pump via the forward-flow line. However, the extraction of hot steam is not possible by means of systems of this type.

PRESENTATION OF THE INVENTION

The object of the invention is to provide a method and a system for the extraction of hot steam from the deep-seated rock, in which the disadvantages of the methods initially mentioned are avoided.

The object is achieved by means of:
a) the method as claimed in claim 1; and
b) the system as claimed in claim 14.

Since the return-flow pipes and the separation pipe are accommodated, together with the forward-flow pipe formed therein, in a single bore hole, the drilling work to be carried out is reduced approximately to half, as compared with the hot dry rock method. Since the forward-flow region and the return-flow region are connected to one another in the lower region of the bore hole via one or more passage orifices in the separation pipe, and, finally, the lower region of the return flow contains a porous filling, a closed system is possible, in which virtually no surrounding water penetrates and which manages essentially with the specific water quantity carried in circulation, with the result that a contamination of the circulation system is appreciably reduced. Thus, virtually no water has to be supplied to the system, and, on the other hand, virtually no water is lost to the surroundings after the start-up, with the result that environmental pollution is substantially reduced. Since water also does not have to be supplied from the surroundings, the contamination or the silting-up of the earth energy exchanger is avoided. Moreover, after the start-up of the system, demineralization of the circulatory water takes place as a result of the repeated evaporation, with the result that the risk of corrosion damage in the pipelines is appreciably reduced. After a particular operating time, the circulatory water can be purified in such a way that further purification is necessary only at longer time intervals. This further contributes appreciably to cost reduction and operating reliability.

In the start-up phase, it may be expedient to supply fresh water and to collect and demineralize in a collecting tank the circulatory water which is contained in the system and is forced out. A further advantage is that improved heat exchange is achieved by means of the porous filling in the return-flow region, so that there is no need to produce artificial crevices in the deep-seated rock. Yet another advantage is that the system according to the present invention does not have to satisfy any special requirements as to geological constitution, with the result that, in turn, there are no special restrictions with regard to the location of such a system.

Advantageous refinements of the method are described in claims 2 to 13 and advantageous refinements of the system are described in claims 13 to 35.

In general, before the system is put into operation, the earth energy exchanger contains circulatory water, for example flushing water or water which has penetrated from the earthly body. The water column pressure prevailing in the forward-flow pipe or forward-flow pipes prevents the removal of steam from the earth energy exchanger as long as the water column pressure in the lower region of the forward-flow pipe or forward-flow pipes is higher than the steam pressure.

According to claim 2, at least one circulating pump may serve for starting up the method, since even low pressure differences are sufficient to set the water columns in the return flow and in the forward flow in motion, with the result that the circulatory water in the forward flow is increasingly heated and finally changes to steam generation.

To start up the method or the system, according to claims 3 to 9, the water column in the forward-flow pipe or in the forward-flow pipes is forced out by means of a connectable pressure medium device. The steam generation which thereupon commences in the lower region of the bore hole drives a circulatory process, in which circulatory water flows from the energy exchanger via the return-flow line and the return-flow pipe or return-flow pipes into the lower region of the bore hole, whereupon the steam which occurs passes via the forward-flow pipe or the forward-flow pipes and the forward-flow line to the energy exchanger and there, with energy being discharged, is returned to circulatory water.

The pressure medium to be introduced during the start-up may be introduced, according to claim 4, in the upper region of the forward-flow pipe or, according to claim 5, in the upper region of the return-flow pipe. It is advantageous if the pressure medium is introduced, preheated, according to claim 6, in order to accelerate the start-up of the system. The pressure medium used may, according to claim 7, be compressed air. It is also advantageous, according to claim 8, to use steam as the pressure medium, which is preferably obtained by an immersion heater being lowered into forward-flow pipe. It is particularly advantageous, according to claim 9, to use water as the pressure medium.

In principle, during the start-up of the system, the circulatory water to be forced out of the earth energy exchanger can be supplied to the earthly body by means of suitable passage orifices. The geological and ecological disadvantages associated with this can be avoided by means of the refinement according to claim 10. In particular, the discharged circulatory water can be collected, purified and demineralized and, if desired, used further.

Good method conditions are obtained if, according to claim 11, work is carried out with a temperature of the backflowing circulatory water of lower than 100° C. and preferably of 20° to 30° C. According to claim 12, the forward-flow temperature of the steam to the energy exchanger should be at least 100° C., preferably 350° to 370°. Further advantageous conditions are described in claim 13.

According to claim 15, the system may contain in the return-flow line and/or in the forward-flow line a circulating pump which may serve, in particular, for starting up the system, but also for operational assistance.

In a refinement according to claim 16, it is also advantageous to start up the system by means of pressure medium. According to claim 17, the system for generation of pressure medium may be designed as a pressure pump. A refinement according to claim 18 is particularly advantageous, the pressure medium device used being an immersion heater which, by being lowered in the forward-flow pipe, evaporates the circulatory water and thus generates the pressure medium.

According to claim 19, the circulatory water to be expelled from the forward-flow pipe during the start-up of the method or of the system is discharged by suitable means above the earth's surface claims 20 and 21 describe suitable discharge means. As already mentioned above, according to claim 22 a particularly preferred solution is to collect in a collecting tank the circulatory water which is to be expelled, in order to free it of pollutants, thus leading to a solution protecting the environment or the system. The collected and purified circulatory water can be supplied to the system again according to claim 23.

The refinement according to claim 24 is particularly advantageous for starting up the system. After the closing of the shut-off valves in the return-flow and the forward-flow line and the shut-off valve between the first forward-flow pipe and the remaining forward-flow pipes, by the pressure medium device being connected at the first forward-flow pipe the circulatory water is initially forced downward in said forward-flow pipe, a corresponding water volume being forced out of the pipe system through the remaining forward-flow pipes via the discharge valve. After the first forward-flow pipe is drained in this way, the applied gas pressure also brings about the drainage of the remaining forward-flow pipes. Subsequently, the pressure medium device is disconnected, and the circulation process driven by the steam power is set in motion by means of the closing of the discharge valve and opening of the shut-off valves in the return-flow and the forward-flow line and of the shut-off valve between the first forward-flow pipe and the remaining forward-flow pipes.

The refinement according to claim 25 reduces heat losses in the forward-flow pipe and can consequently increase the efficiency of the system.

It is conceivable, in principle, that only one return-flow pipe is arranged in the return-flow region. However, substantially better results can be achieved by means of a design according to claim 26, since, then, all the regions of the bore hole can be covered uniformly and be utilized for energy extraction. The advantage of arranging a plurality of pipes in the forward flow and/or return flow is that the system can be operated at a plurality of speeds, depending on the connection and disconnection of individual pipes.

A further improvement in efficiency is achieved by means of the refinement according to claim 27, in that heat exchange between the circulatory water and the earthly body is prevented in the upper part of the bore hole, where the earth's temperature is lower than the temperature of the circulatory water, whereas an increased heat exchange is achieved in the lower part of the bore hole, where the earth's temperature is higher than the temperature of the circulatory water. Moreover, as a result, the penetration of contaminated water from the upper earth strata into the bore hole is prevented.

A refinement of the system according to claim 28 is particularly advantageous, since a reduced flow resistance is achieved due to the presence of passage orifices in the lower region of the separation pipe and since the forward-flow pipes are not formed in said region.

The necessary bore hole depth depends on the temperature profile in the earth's crust. In regions without pronounced geothermal anomalies, bore hole depths of, for example, 2500 to 12 000 m according to claim 29 are expedient. However, even greater depths are possible.

A further improvement in heat exchange between the circulatory water and the earthly body is achieved by means of the formation of lateral deflection bores in the refinement according to claim 30. Such deflection bores may be blind bores, but continuous bores are more advantageous, which again terminate in the bore hole. As a result, the heat-transmitting surface and consequently the performance of the earth energy exchanger can be increased substantially. If such deflection bores run essentially in the direction of the bore hole according to claim 31, they are simpler to produce. In the arrangement radial to the bore hole according to claim 32, the deflection bores are located in zones of higher temperature and thus make it possible to have a higher steam energy with a smaller transmission surface.

The energy exchanger fed with the generated steam may be, according to claim 33, a direct energy consumer or, according to claim 34, also a heat exchanger which heats a further circuit. The latter makes it possible, in particular, to have a closed circulation process, in which no pressure breakdown and therefore no precipitation of any minerals in the circulatory water take place, with the result that silting-up of the system can be forestalled. The refinement whereby electrical current is generated is particularly advantageous. Such a system can be further improved if heating heat is additionally produced, with the result that the temperature of the backflowing circulatory water is further lowered and the efficiency of the system is increased. Expediently, according to claim 35, a turbine serving for driving a current generator is operated by the ORC process, that is to say Organic Rankine Cycles.

BRIEF DESCRIPTION OF THE DRAWINGS

Exemplary embodiments of the invention are described in more detail below with reference to the drawings, in which.

WAYS OF IMPLEMENTING THE INVENTION

Figure 1:
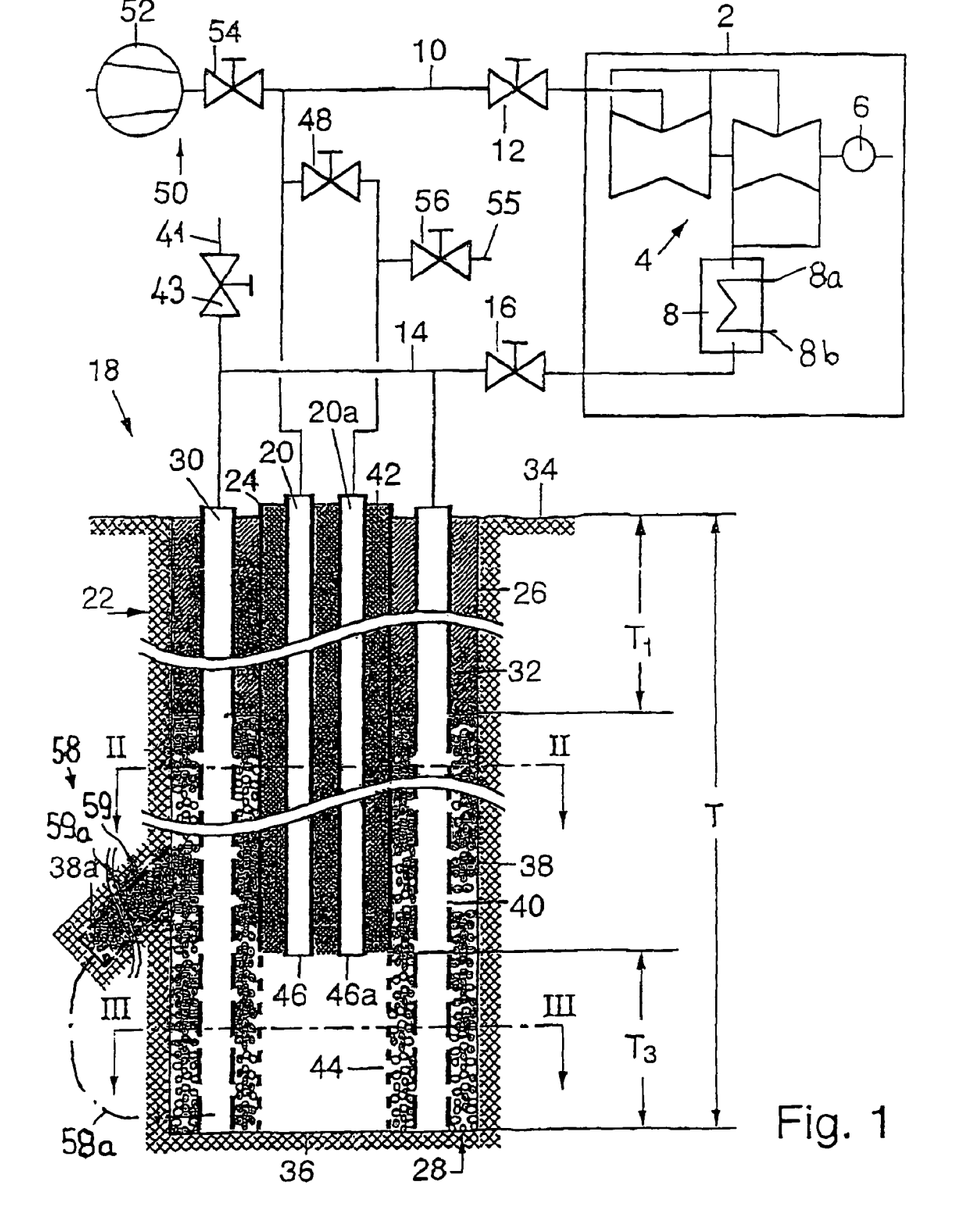
FIG. 1 shows a diagrammatic illustration of a system in vertical section.

FIG. 1 shows a system for the utilization of earth energy, for example for feeding an energy exchanger 2. The energy exchanger 2 consists preferably of a multistage turbine 4, which drives a current generator 6, and of an energy consumer 8 which is connected to the delivery line of the turbine 4 and which may constitute, for example, a heating heat network. The energy exchanger 2 is connected, via a forward-flow line 10 with a regulatable shut-off valve 12 and via a return-flow line 14 with a regulatable shut-off valve 16, to an earth energy exchanger 18 which contains at least two heat-insulated forward-flow pipes 20 and 20a in a bore hole 22. The forward-flow pipes 20 and 20a are surrounded by a separation pipe 24 which has adjoining it, radially outward as far as the bore hole wall 26, a return-flow region 28, in which return-flow pipes 30 are arranged. The bore hole region receiving the return-flow pipes 30 is sealing in the upper region 32, to a distance $T_1$ of preferably 2000 to 2500 m below the earth's surface 34, and is provided with a porous filling 38, for example with gravel, in the lower region as far as the bore hole floor 36. The walls of the return-flow pipes 30 have, in the region of the porous filling 38, passage orifices 40 for an improved heat exchange, since the water and/or steam emerge from the return-flow pipes 30 into the porous filling, are further heated and can flow back into the return-flow pipes 30. A supply line 41 with a shut-off valve 43 is connected to the return-flow line 14, in order to add water to the circulation process as required, for example in the event of seepage or evaporation of circulatory water.

To increase the efficiency of the system, the region between the forward-flow pipes 20 or 20a and the separation pipe 24 is filled with an insulating material 42. The forward-flow pipes 20 and 20a terminate at a distance $T_3$ of preferably 400 m above the bore hole floor 36, and the separation pipe 24 is provided, in the region therebelow, with passage orifices 44. The forward-flow pipes 20 and 20a communicate with one another in the region of their lower inlet orifices 46 and 46a.

At the earth's surface 34, the first forward-flow pipe 20 is connected to the forward-flow line 10. The second forward-flow pipe 20a is connected to the forward-flow line 10 via a regulatable shut-off valve 48. A connectable pressure medium device 50 is designed, here, as a pressure pump installation and consists of at least one pressure pump 52 and of a regulatable connecting valve 54. This pressure pump installation is connected to the forward-flow line 10 in the region between the first forward-flow pipe 20 and the shut-off valve 12. The pressure pump 52 is designed as a hydraulic pump for preferably hot water and, if appropriate, as a compressor for compressed air. A discharge line 55 having a discharge valve 56 is located in the region of the forward-flow line 10 between the second forward-flow pipe 20a and the shut-off valve 48.

Before the system according to FIG. 1 is put into operation, the earth energy exchanger 18 contains, in general, circulatory water. As a result of the connection between the return-flow pipes 30 and the forward-flow pipes 20 and 20a in the lower region of the bore hole 22, the water level in the forward-flow pipes 20 and 20a is essentially at the same height as the water level in the return-flow pipes 30. The water column present in the forward-flow pipes 20 and 20a and in the return-flow pipes 30 prevents an extraction of hot steam. To start up the system according to FIG. 1, the connectable pressure pump installation 50 is connected to the first forward-flow pipe 20 as a result of the opening of the connecting valve 54, while the shut-off valve 48 between the forward flow pipes 20 and 20a and the shut-off valves 12 and 16 of the forward-flow line 10 and of the return-flow line 14 are closed. The old circulatory water is thereby discharged from the forward-flow pipe 20 through the second forward-flow pipe 20a via the open discharge valve 56. After the replacement of the old circulatory water by hot water has taken place or after the drainage of the forward-flow pipes 20 and 20a by means of compressed air, steam generation commences in the earth energy exchanger 18. The pressure pump installation 50 is separated from the forward flow as a result of the closing of the connecting valve 54, the shut-off valve 48 is opened and the discharge valve 56 is closed. By the opening of the shut-off valve 16 in the return-flow line 14, as much circulatory water is supplied to the earth energy exchanger 18 as steam is discharged from the earth energy exchanger 18 through the forward-flow line 10 after the opening of the shut-off valve 12. A circulation process driven by the steam power is consequently set in motion. The temperature, pressure and/or quantity of the steam in the forward-flow line 10 is advantageously regulated by means of the regulatable shut-off valve 12. If a large amount of steam is extracted, the temperature of the steam falls and, conversely, the temperature of the steam rises when a small amount of steam is extracted. To improve the heat exchange, the bore hole 22 can be provided, in the region below a distance $T_1$, which may amount, for example, to at least 500 m, from the earth's surface, with lateral deflection bores 58 which, as shown, are designed as blind bores or, as indicated by dashes and dots, preferably as passage bores 58a. They likewise contain a pipe 59, if appropriate with holes 59a in the wall, and are provided with a porous filling 38a. Such deflection bores 58a may commence at 500 to 4000 m from the earth's surface and issue again a 2500 to 12 000 m into the bore hole 22 and serve for increasing the heat-transmitting surfaces. Only one such deflection bore may be present, but, expediently, a plurality of deflection bores arranged so as to be distributed around the bore hole may be present.

Figure 2:
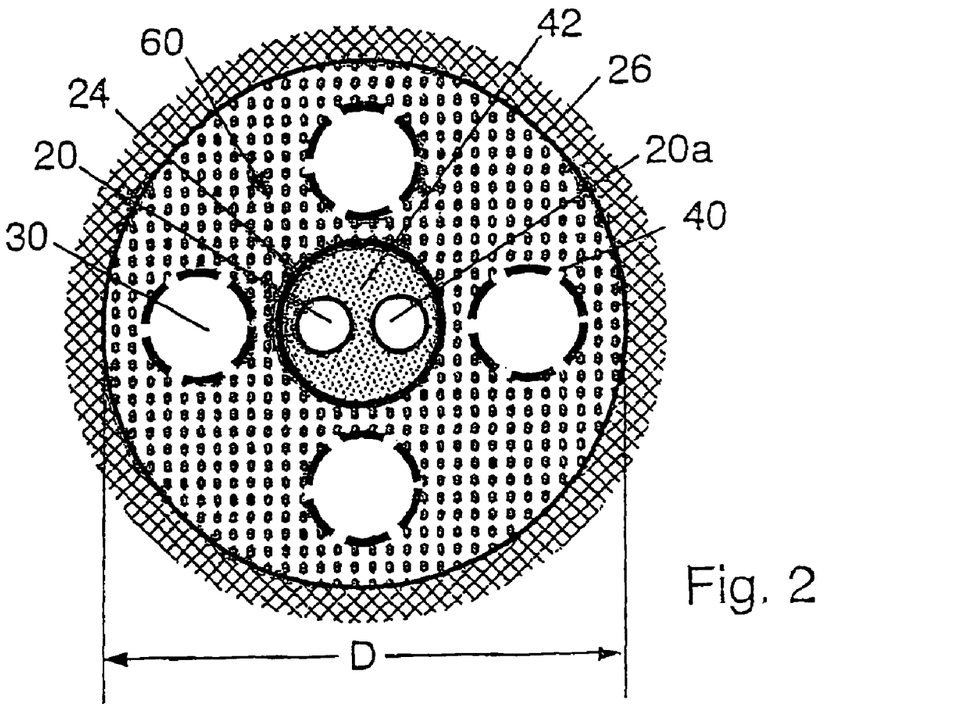
FIG. 2 shows a diagrammatic illustration of the pipe system of a system in horizontal section II—II of FIG. 1 and on a larger scale.

FIG. 2 shows a diagrammatic illustration of the system according to FIG. 1 in horizontal section II—II of FIG. 1 at depth of, for example, 1000 to 12 000 m below the earth's surface 34. The bore hole has a diameter D of, for example, 150 to 500 mm. The region within the separation pipe 24 between the forward-flow pipes 20 and 20a is filled with insulating material 42. In the annular region 60 of the bore hole 22 between the separation pipe 24 and the bore hole wall 26 are arranged, for example, four return-flow pipes 30 distributed over the circumference. The cavity of the annular region 60 between the return-flow pipes 30 is filled with a porous filling 38. The wall of the return-flow pipes 30 is provided with passage orifices 40.

Figure 3:
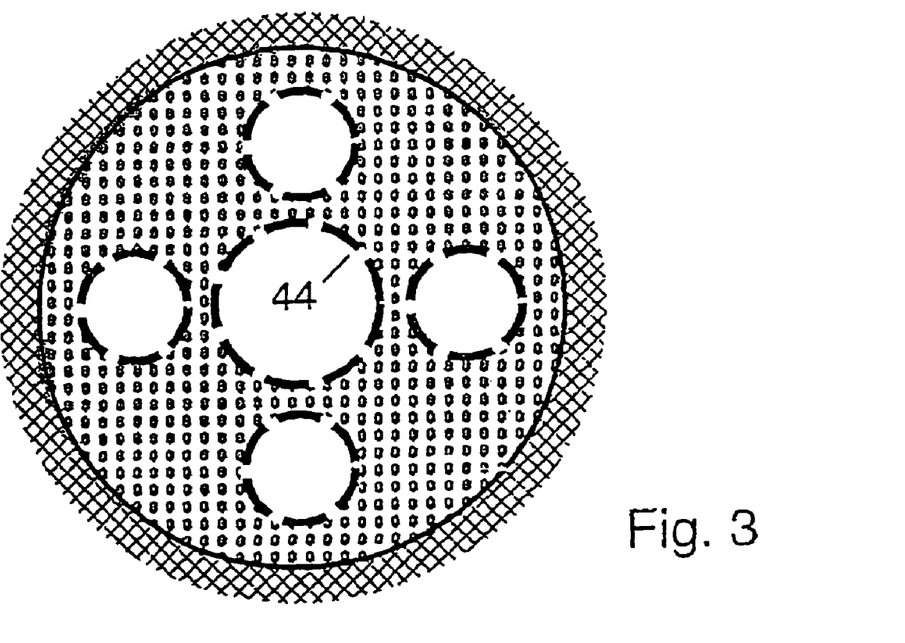
FIG. 3 shows a diagrammatic illustration of the pipe system of a system in horizontal section III—III of FIG. 1 and on a larger scale.

FIG. 3 shows a diagrammatic illustration of the system according to FIG. 1 in the horizontal section III—III of FIG. 1 in a depth region $T_3$ of, for example, up to 400 m above the bore hole floor 36. The separation pipe 24 is provided with passage orifices 44 and is free of forward-flow pipes and of insulating material and serves as a collecting space for the steam.

The start-up of the system, that is to say steam generation, commences at a temperature of above 100° C. The operating temperature for the energy exchanger 2 is higher than 100° C. and is preferably 350° to 370° C. in the forward-flow line 10. In the multistage steam turbine 4 of the energy exchanger 2, the steam is cooled to less than 100° C. and condenses to form circulatory water which is supplied to the energy consumer 8, for example a heat exchanger. In the heat exchanger, a forward flow 8a of a consumer circuit is heated to about 90° C. and, after the discharge of heat, flows as return flow 8b at approximately 20° C. back to the heat exchanger. The result of this is that the circulatory water leaves the heat exchanger 8 and consequently the energy exchanger 2 at a temperature of about 25° to 30° C. and is supplied to the return-flow pipes 30 via the return-flow line 14.

Figure 4:
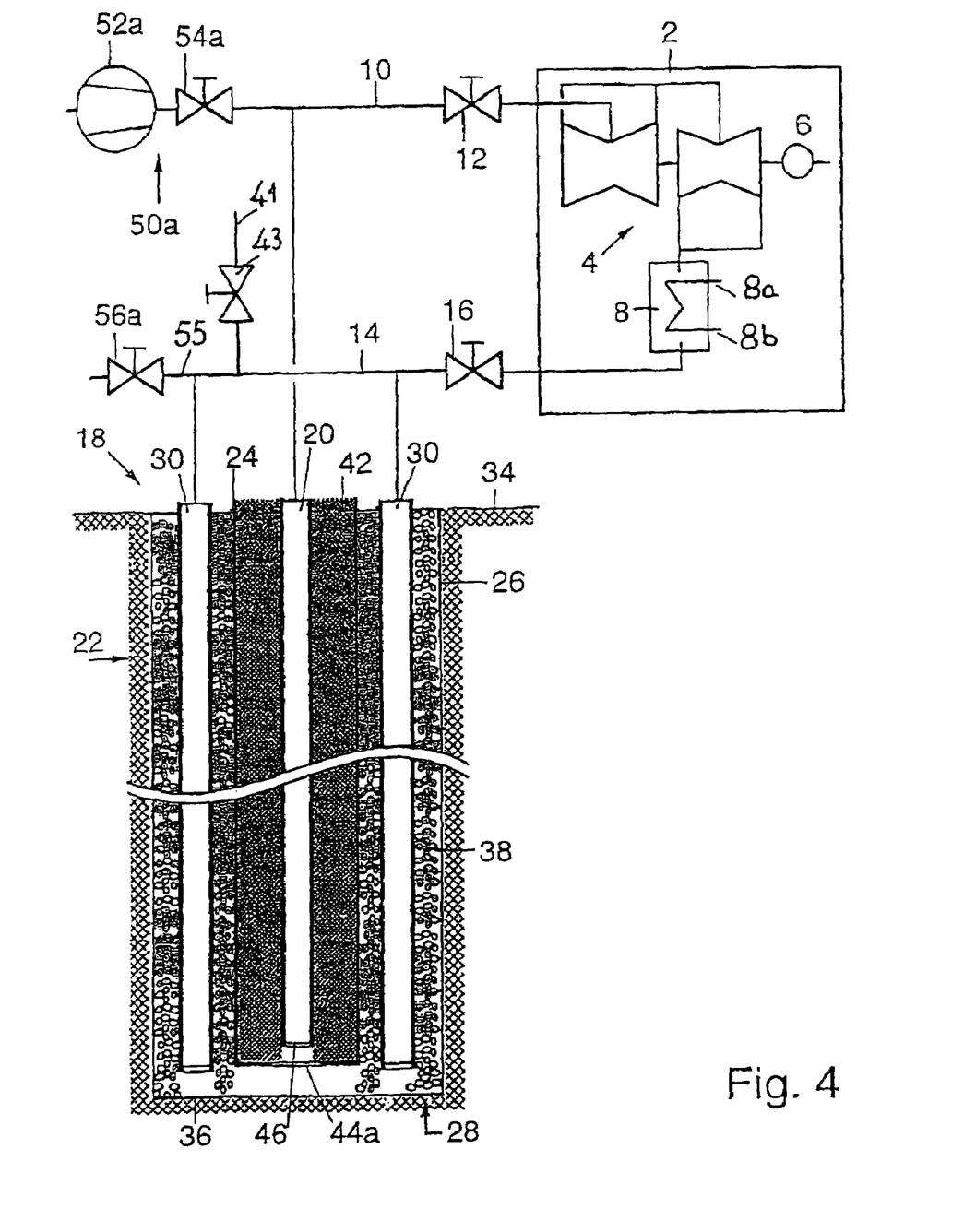
FIG. 4 shows a diagrammatic illustration of a modified system in vertical section.

FIG. 4 shows a system according to FIG. 1, although only one forward-flow pipe 20 is formed. The return-flow region 28 is connected to the lower inlet orifice 46 of the forward-flow pipe 20 in the lower region of the bore hole 22 via one or more passage orifices 44a in the separation pipe 24. Alternatively, the entire lower region of the bore hole 22 is designed as is illustrated in FIGS. 1 and 3. The return-flow pipes 30 are combined into the return-flow line 14 which is provided, in the region between the earth energy exchanger 18 and the shut-off valve 16, preferably with a discharge valve 36a to a discharge line 55. Furthermore, a supply line 41 with a shut-off valve 43 for the supply of fresh water or recirculation water is connected to the return-flow line 14. A connectable pressure medium device 50a, which again is designed as pressure pump installation consisting of at least one pressure pump 52a and of a connecting valve 54a, is connected to the forward-flow line 10 in the region between the earth energy exchanger 18 and the shut-off valve 12.

To start up the system shown in FIG. 4, with the shut-off valve 12 of the forward-flow line 10 being closed and with the shut-off valve 16 of the return-flow line 14 being closed, the pressure pump installation 50a is connected by the opening of the connecting valve 54a. The circulatory water in the forward-flow pipe 20 is forced downward and is discharged through the return-flow pipes 30 via the discharge valve 56a above the earth's surface 34. After the drainage of the forward-flow pipe 20 and filling with hot water have taken place, steam generation commences in the earth energy exchanger 18. The pressure pump installation 50a is separated from the forward-flow line 10 by the closing of the connecting valve 54a and the discharge valve 56a is closed. By the opening of the shut-off valve 16 in the return-flow line 14 and of the shut-off valve 12 in the forward-flow line 10, the circulation process is set in motion by means of the steam power.

Figure 5:
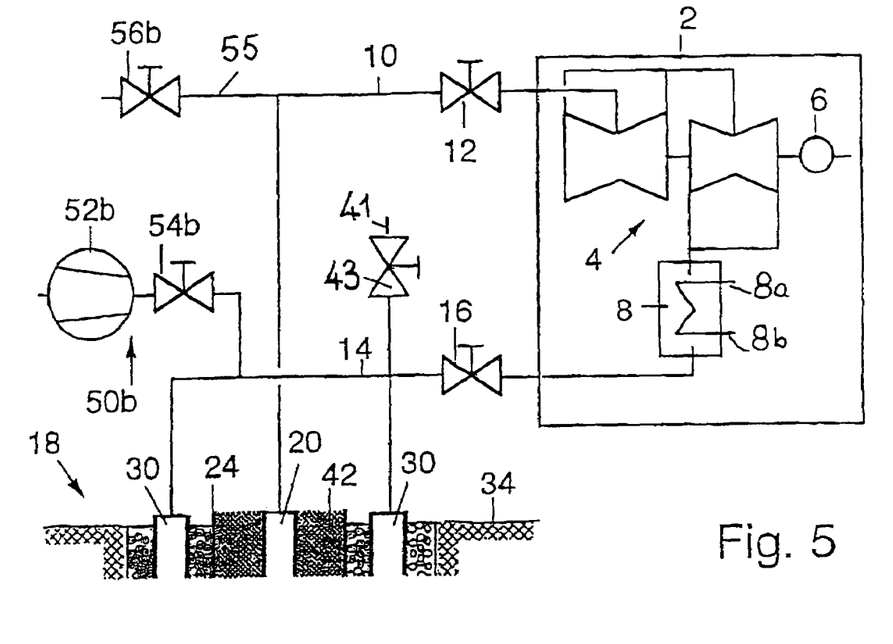
FIG. 5 shows a diagrammatic illustration of a modified line system of the system in FIG. 4 in vertical section.

FIG. 5 shows the above-ground line system of the system of FIG. 4, although the connectable pressure medium device 50b is not connected to the forward-flow line 10, as in the example of FIGS. 1 and 3, but to the return-flow line 14 in the region between the earth energy exchanger 18 and the shut-off valve 16. A discharge line 55 with a discharge valve 56b is connected to the forward-flow line 10 in the region between the earth energy exchanger 18 and the shut-off valve 12. In this case, to start up the system, with the shut-off valves 12, 16 in the forward-flow line 10 and in the return-flow line 14 being closed, at least one return-flow pipe 30 and the forward-flow pipe 20 are drained or filled with hot water by means of the pressure pump installation 50b, with the connecting valve 54b open, the forced-out circulatory water running out via the open discharge valve 56b and the discharge line 55. As soon as the operation has ended, the discharge valve 56b and the connecting valve 54b must be closed. By the opening of the shut-off valve 12 of the forward-flow line 10, steam which has occurred can be conducted to the energy exchanger 2. The circulatory water necessary for steam generation is made available by the opening of the shut-off valve 16 via the return-flow line 14 and the return-flow pipes 30, if appropriate with a pressure pump (not illustrated) temporarily being interposed, and/or from the earthly body in the lower region of the bore hole and/or via a supply line 41 connected to the return-flow line 14 via a shut-off valve 43.

Figure 6:
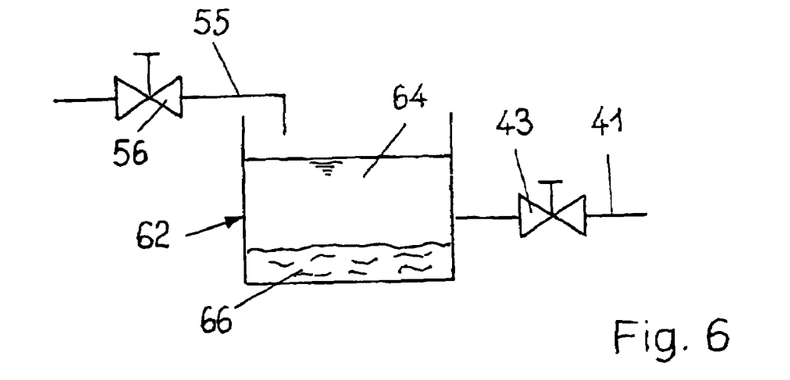
FIG. 6 shows a diagrammatic illustration of a collecting tank for circulatory water in vertical section.

In such systems, the circulatory water forced out of earth energy exchanger 18 via the discharge valve 56, 56a, 56b and the discharge line 55 during the start-up of the system is preferably not discharged into the surroundings, but, according to the exemplary embodiment of FIG. 6, is collected in a collecting tank 62. There, the circulatory water 64 can be purified, for example freed of sludge 66 and be demineralized and, if required, supplied anew to the circulation process via the supply line 41 and the shut-off valve 43. The collecting tank 62 may also serve, in general, for treatment, such as purification, demineralization, etc., of the circulatory water, should the result of measurements indicate that the latter is too heavily contaminated for the circulation process. Environmental pollution by the forced-out, at most impure circulatory water is thereby avoided. Owing to the purification and, if need be, treatment of the forced-out circulatory water, optimally adjusted water can be supplied to the circulation process, as a result of which, on the one hand, the system itself is protected from damage, in particular corrosion, and, on the other hand, the earthly body surrounding the earth energy exchanger 18 is protected from damage caused by impurities.

Figure 7:
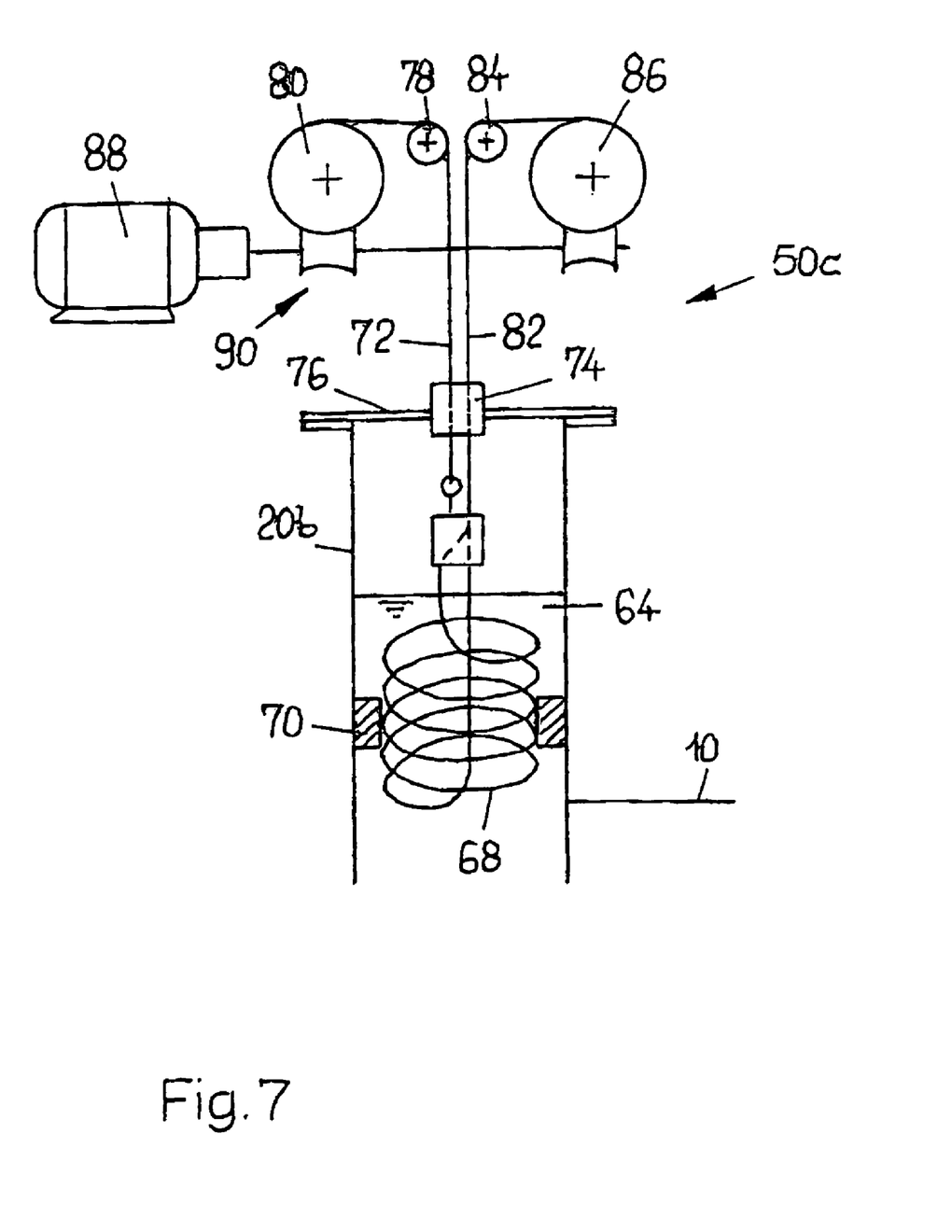
FIG. 7 shows a diagrammatic illustration of a pressure medium device in vertical section.

FIG. 7 shows a further exemplary embodiment of a pressure medium device 50c which, instead of pressure medium, such as compressed air or pressure water, of the pressure pump installations of the exemplary embodiments of FIGS. 1 to 4, evaporates the circulatory water 64 in the forward-flow pipe 23 and uses the steam as pressure medium for expelling the circulatory water 64 out of the forward-flow pipe 20b. The pressure medium device contains an immersion heater 68 which is immersed into the circulatory water 64 of the forward-flow pipe 20b and which is guided and centered in the forward-flow pipe by means of lateral guide elements 70. The immersion heater 68 is suspended on a steel rope 72 which is led through a pressure lock 74 in a closing cover 76 of the forward-flow pipe 20b outward and, via a deflecting roller 78, to a winch 80. In a similar way, an electrical supply line 82 of the immersion heater 68 is led outward through the pressure lock 74 and to a winch 86 via a deflecting roller 84. The two winches 80, 86 are driven in opposite directions by a common drive motor 88 and a common transmission 90. The immersion heater 68 can follow the water level of the circulatory water by means of the winches 80, 86, according to the progressive evaporation and progressive displacement of the circulatory water, until steam generation commences in the earth energy exchanger and the circulation process is set in motion. The immersion heater 68 can then be brought back into the initial position by means of the winches 80, 86.

Figure 8:
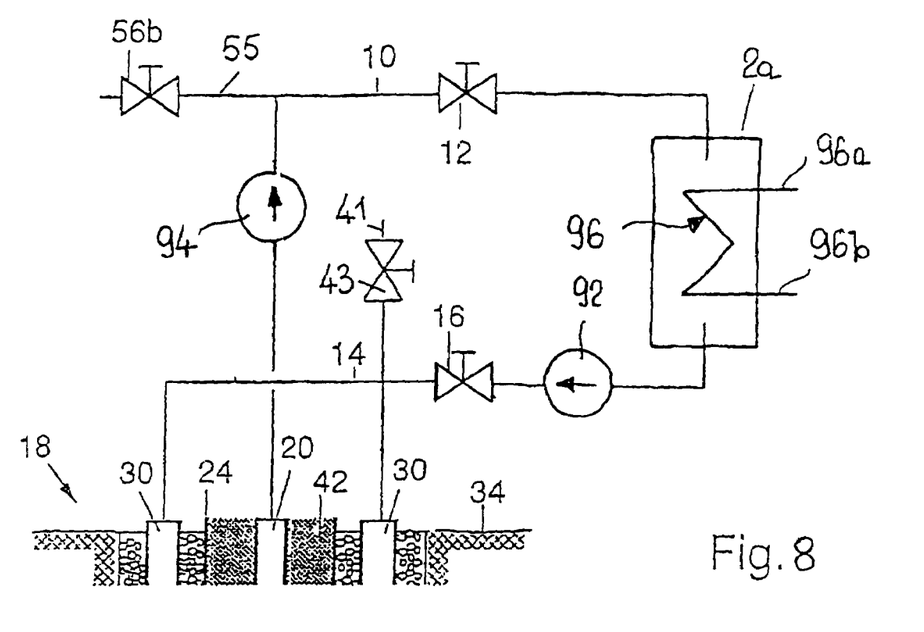
FIG. 8 shows a diagrammatic illustration of a system with circulating pumps in vertical section.

FIG. 8 shows the above-ground line system of the system of FIG. 5, although, instead of the connectable pressure medium device 50b of FIG. 5, a circulating pump 92 and 94 is arranged respectively in the return-flow line 14 and, if need be, in the forward-flow line 10. A discharge line 55 with a discharge valve 56b is again connected to the forward-flow line 10, specifically downstream of the circulating pump 94. Furthermore, again, a supply line 41 with a shut-off valve 43 is connected to the return-flow line 14. The energy exchanger 2a is a closed system which connects the system to a second circuit 96 with a forward-flow 96a and with a return-flow 96b which lead to one or more energy consumers, such as turbines (for example, for current generators), heating arrangements and the like. In this case, the shut-off valves 12, 16 in the forward-flow line 10 and in the return-flow line 14 may be dispensed with. To start up the system, the circulating pumps 92, 94 are switched on and the circulatory water is circulating the system until it has been heated in such a way that, during the discharge of a part quantity of the circulatory water via the discharge line 55 and during the pressure breakdown associated with this, steam occurs in the circuit and circulation becomes automatic, so that the circulating pumps 92, 94 can be switched off.

Figure 9:
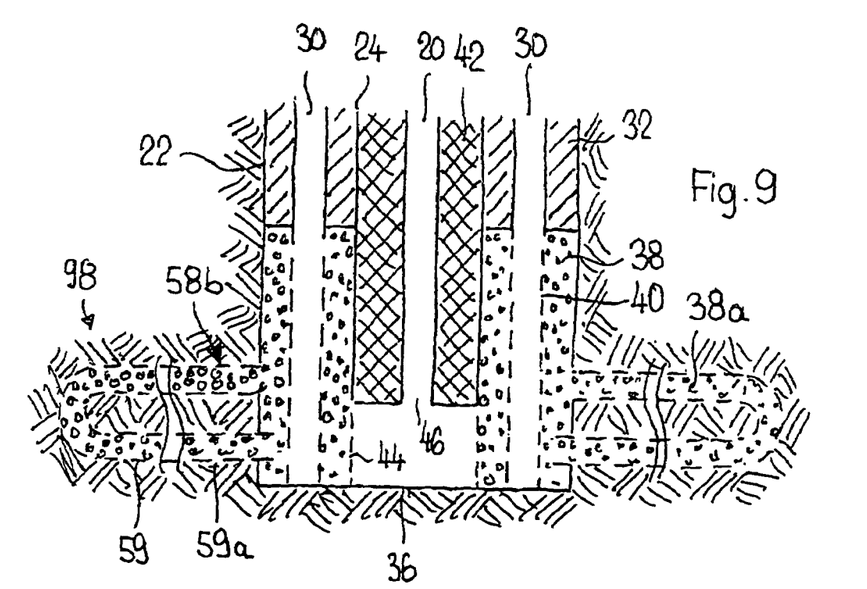
FIG. 9 shows a detail of an earth heat exchanger with radially running deflection bores in vertical section.

FIG. 9 shows the lowermost region of the bore hole 22 similar to the example of FIG. 1, the lateral deflection bores 58b not running in the direction of the bore hole 22, but essentially radially thereto. The deflection bores 58b emerge radially from the bore hole 22 above the bore hole floor 36, form a loop 98 and reenter the bore hole 22 near the bore hole floor 36. The deflection bore 58b is again lined with a pipe 59 having holes 59a and is provided with a porous filling 38a. By means of this configuration, a large heat exchanger surface at an earth depth having a high temperature is achieved.

| List of reference symbols | |
|---|---|
| 2 | Energy exchanger |
| 4 | Multistage steam turbine |
| 6 | Current generator |
| 8 | Energy consumer |
| 8a | Forward-flow |
| 8b | Return flow |
| 10 | Forward-flow line |
| 12 | Regulatable shut-off valve |
| 14 | Return-flow line |
| 16 | Regulatable shut-off valve |
| 18 | Earth energy exchanger |
| 20, 20a, 20b | Forward-flow pipe |
| 22 | Bore hole |
| 24 | Separation pipe |
| 26 | Bore hole wall |
| 28 | Return-flow region |
| 30 | Return-flow pipe |
| 32 | Sealing region |
| 34 | Earth's surface |
| 36 | Bore hole floor |
| 38, 38a | Porous filling |
| 40 | Passage orifices in the return-flow pipe |
| 41 | Supply line |
| 42 | Insulating material |
| 43 | Shut-off valve |
| 44, 44a | Passage orifices in the separation pipe |
| 46a, 46a | Lower inlet orifice of the forward-flow pipe |
| 48 | Shut-off valve |
| 50, 50a, 50b, 50c | Connectable pressure medium device (pressure pump) |

-continued

| List of reference symbols | |
|---|---|
| 52, 52a, 52b | Pressure pump |
| 54, 54a, 54b | Regulatable connecting valve |
| 55 | Discharge line |
| 56, 56a, 56b | Discharge valve |
| 58 | Lateral deflection bore |
| 58a | Lateral deflection bore |
| 58b | Lateral deflection bore |
| 59 | Pipe |
| 59a | Hole |
| 60 | Annular region |
| 62 | Collecting tank |
| 64 | Circulatory water |
| 66 | Sludge |
| 68 | Immersion heater |
| 70 | Guide element |
| 72 | Steel rope |
| 74 | Pressure lock |
| 76 | Closing cover |
| 78 | Deflecting roller |
| 80 | Winch |
| 82 | Electrical supply line |
| 84 | Deflecting roller |
| 86 | Winch |
| 88 | Drive motor |
| 90 | Transmission |
| 92 | Circulating pump |
| 94 | Circulating pump |
| 96 | Second circuit |
| 96a | Forward flow |
| 96b | Return flow |
| 98 | Loop |

The invention claimed is:

1. A method for exchanging energy between earthly bodies and an energy exchanger for current generation, the energy exchanger being connected in a circulation process, via a forward-flow line for steam and a return-flow line for circulatory water, to an earth energy exchanger which extends to a steam-generating depth of the earthly body, characterized in that, for forward flow and return flow in the earthly body, use is made of a common bore hole, in which at least one heat-insulated forward-flow pipe is surrounded by a separation pipe which has adjoining it radially outward a return-flow region for circulatory water which contains at least one return-flow pipe connected to the return-flow line and, at least in the lower region, a porous filling and which is connected to a lower inlet orifice of the forward-flow pipe at least at the floor of the bore hole via one or more passage orifices in the separation pipe.

2. The method as claimed in claim 1, characterized in that the circulation process and consequently steam generation are set in motion by means of at least one circulating pump.

3. The method as claimed in claim 1, characterized in that, to start up the circulation process, a water column located in the forward-flow pipe is forced out by means of pressure medium, until steam is obtained, and is present with predetermined nominal values at the energy exchanger.

4. The method as claimed in claim 3, characterized in that the pressure medium is introduced in the upper region of the forward-flow pipe.

5. The method as claimed in claim 3, characterized in that the pressure medium is introduced in the upper region of the return-flow pipe.

6. The method as claimed in one of claim 1, characterized in that a preheated pressure medium is used.

7. The method as claimed in one of claim 3, characterized in that the pressure medium used is compressed air.

8. The method as claimed in one of claim 3, characterized in that the pressure medium used is steam which is generated by the continuous evaporation of the water column in the forward-flow pipe by means of an immersion heater.

9. The method as claimed in one of claim 1, characterized in that the pressure medium used is pressure water.

10. The method as claimed in one of claim 3, characterized in that a circulatory water which emerges from the forward-flow pipe from the circulation process during the start-up of the circulation process is collected in a collecting tank and treated and is used for topping up the circulation process as required.

11. The method as claimed in one of claim 1, characterized in that circulatory water having a temperature of below 100° C. is supplied to the return-flow pipe.

12. The method as claimed in one of claim 1, characterized in that steam with a temperature of at least 100° C. is supplied to the energy exchanger.

13. The method as claimed in one of claim 1, characterized in that the steam pressure which develops is compensated in that a water column located above the steam in the return-flow region is forced downward in order to raise the temperature and pressure, so that in the forward-flow region, at a depth of 7500 to 12 000 m, steam with a pressure of, for example, 50 to 60 bar is formed, which flows via the preferably thermally insulated forward-flow region to the energy exchanger.

14. A system for carrying out the method as claimed in claim 1, characterized in that the energy exchanger is connected via a forward-flow line and a return-flow line for circulatory water to an earth energy exchanger which has at least one heat-insulated forward-flow pipe in a bore hole, the forward-flow pipe being surrounded in the bore hole by a separation pipe which has adjoining it radially outward a return-flow region for circulatory water which contains at least one return-flow pipe connected to the return-flow line and, at least in the lower region, a porous filling and which is connected to a lower inlet orifice of the forward-flow pipe at least at the floor of the bore hole via one or more passage orifices in the separation pipe.

15. The system as claimed in claim 14, characterized in that a circulating pump is arranged in the return-flow line and/or in the forward-flow line.

16. The system as claimed in claim 14, characterized in that the forward-flow line and the return-flow line are provided in each case with a regulatable shut-off valve, and a connectable device for generating a pressure medium for expelling the circulatory water out of the forward-flow pipe and consequently for triggering steam generation and steam conveyance is connected either to the forward-flow line between the shut-off valve and the earth energy exchanger or to the return-flow line between the shut-off valve and the earth energy exchanger.

17. The system as claimed in claim 16, characterized in that the pressure medium device is designed as a pressure pump.

18. The system as claimed in claim 16, characterized in that the pressure medium device is designed as an immersion heater capable of being lowered into the forward-flow pipe.

19. The system as claimed in claim 14, characterized in that means for the discharge of circulatory water out of the forward-flow pipe are present above the earth's surface.

20. The system as claimed in claim 19, characterized in that the discharge means have a discharge valve arranged in the return-flow line between the earth energy exchanger and the shut-off valve.

21. The system as claimed in claim 19, characterized in that the discharge means have a discharge valve arranged in the forward-flow line between the earth energy exchanger and the shut-off valve.

22. The system as claimed in claim 19, characterized in that the discharge means have a collecting tank which contains preferably a supply line connected to the return-flow line.

23. The system as claimed in claim 14, characterized in that a supply line for water is arranged on the return-flow line via a shut-off valve.

24. The system as claimed in claim 14, characterized in that the separation pipe has arranged within it at least one further forward-flow pipe which communicates on the earth side with a first forward-flow pipe and which is connected to the first forward-flow pipe at the earth's surface via a shut-off valve and has a discharge valve for the discharge of the circulatory water capable of being expelled via the first forward-flow pipe through the second forward-flow pipe by means of the pressure medium device.

25. The system as claimed in claim 14, characterized in that the region between the forward-flow pipe and the separation pipe is filled by means of an insulating material.

26. The system as claimed in claim 14, characterized in that at least two, preferably a plurality of, return-flow pipes distributed around the separation pipe are arranged in the annular region between the separation pipe and the bore hole wall.

27. The system as claimed in claim 14, characterized in that the bore hole region receiving the return-flow pipe is designed to be sealing in the upper region, preferably from 1000 to 2500 m from the earth's surface, and is provided with the porous filling in the lower region as far as the bore hole floor, the wall of the return-flow pipe being provided with passage orifices in the region of the porous filling.

28. The system as claimed in claim 14, characterized in that the forward-flow pipe terminates 400 m above the bore hole floor, and the separation pipe is provided with passage orifices in this region.

29. The system as claimed in claim 14, characterized in that the bore hole has a depth T of 2500 to 12 000 m.

30. The system as claimed in claim 14, characterized in that the bore hole has at least one lateral deflection bore which issues into the bore hole again in the region of the passage orifice of the separation pipe.

31. The system as claimed in claim 30, characterized in that the deflection bore runs essentially in the direction of the bore hole.

32. The system as claimed in claim 30, characterized in that the deflection bore runs essentially radially to the bore hole.

33. The system as claimed in claim 14, characterized in that the energy exchanger has a multistage turbine which is connected to a current generator, the turbine preferably being followed by a further energy consumer.

34. The system as claimed in claim 14, characterized in that the energy exchanger connects the earth's circulation process to a second circulation process which contains a multistage turbine with a current generator.

35. The system as claimed in claim 33, characterized in that the turbine is designed to operate according to the ORC process.

* * * * *